United States Patent [19]

Smith

[11] 4,134,705

[45] Jan. 16, 1979

[54] DRILLING APPARATUS

[76] Inventor: Samuel C. Smith, 210 Harlman Rd., Newton Centre, Mass. 02159

[21] Appl. No.: 791,858

[22] Filed: Apr. 28, 1977

[51] Int. Cl.² .................. B23B 45/06; B23B 45/14
[52] U.S. Cl. ................................ 408/112; 279/1 DC
[58] Field of Search ............... 408/112, 234, 72, 110, 408/111, 136, 127, 238, 239 R; 145/66; 279/1 DC

[56] References Cited

U.S. PATENT DOCUMENTS

| 386,566 | 7/1888 | Tripp | 408/88 |
|---|---|---|---|
| 2,747,384 | 5/1956 | Beam | 408/127 X |
| 2,764,192 | 9/1956 | Poss | 408/127 X |
| 2,831,376 | 4/1958 | Daniels | 408/112 X |
| 3,890,058 | 6/1975 | Self, et al. | 408/112 |

*Primary Examiner*—Horace M. Culver
*Attorney, Agent, or Firm*—Thompson, Birch, Gauthier & Samuels

[57] ABSTRACT

This invention relates to a drilling apparatus which is specially designed to facilitate accurate drilling within close quarters, such as about one-half inch or less, of another surface, for example drilling close to the corner of a wall. The drilling apparatus of this invention may be operated either manually or by power means.

8 Claims, 3 Drawing Figures

DRILLING APPARATUS

BACKGROUND OF THE INVENTION

Although many types of drilling devices are known in the art, the structural design of these tools is such that they cannot be operated within close distances of other protruding surfaces. This type of problem commonly arises, for example, in drilling holes very close to the corner of two walls, a wall and ceiling, or the juncture of two walls and a ceiling. Existing drilling devices are too bulky and awkward to be maneuvered properly under close-quarter conditions. They cannot be adequately rotated, and they cannot be held in a precise position. Efforts to use existing drilling devices for close quarter applications often result in sloppy or inaccurate holes which are off-center or else are not exactly perpendicular to the drilling surface.

Examples of existing drilling devices are shown in U.S. Pat. Nos. 2,670,638; 2,785,712; 2,909,085; 3,119,286; 3,827,822; and 3,890,058. Each of these patents relates to a drilling apparatus which includes guide means of some sort. None of these patents, however, discloses or suggests a drilling apparatus which is capable of being operated in close quarters such as within one-half inch or less of a corner or juncture of two or more surfaces.

OBJECTS OF THE INVENTION

Accordingly, it is the primary object of this invention to provide a drilling apparatus suitable for close-quarter applications.

It is a further object of this invention to provide a close-quarter drilling apparatus adaptable to either manual or power operation.

Still another object of this invention is to provide a close-quarter drilling apparatus which is sturdy, lightweight, and readily transportable.

It is a specific object of this invention to provide a drilling apparatus for drilling accurate holes of about 1/64"-⅛" in diameter within about ½" or less of the juncture of two or more surfaces.

These and other objects and advantages of this invention will become apparent from the following description.

BRIEF DESCRIPTION OF THE INVENTION

The drilling apparatus of this invention comprises, essentially, a standard drill body having a chuck on each end which is rotatably mounted on a support frame which, in turn, is slidably mounted on a guide frame. The chuck at the drilling end of the drill body accomodates a standard drill bit, and the chuck at the opposite end accomodates either a crank for manual operation or a flexible shaft for power operation.

DETAILED DESCRIPTION OF THE DRAWINGS

Figure 1:
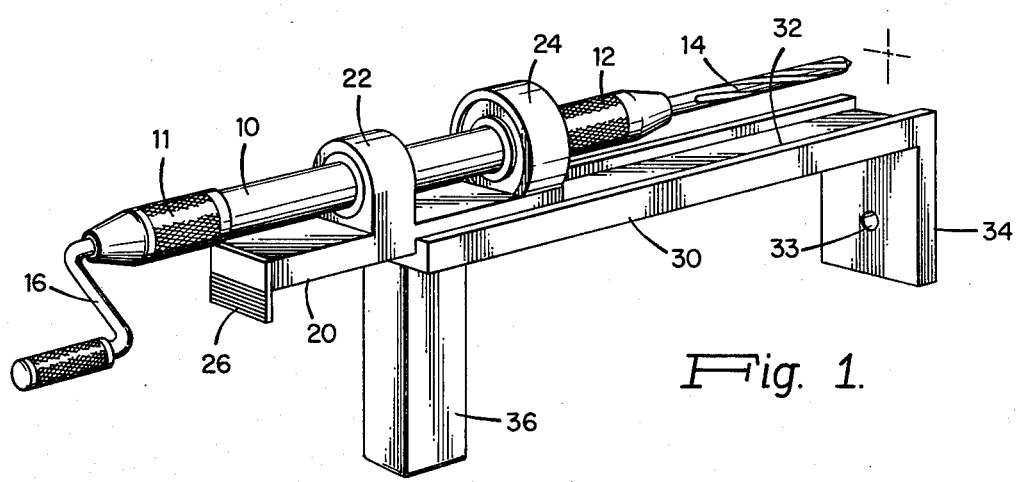
FIG. 1 is a perspective view of the drilling apparatus of this invention.
Figure 3:
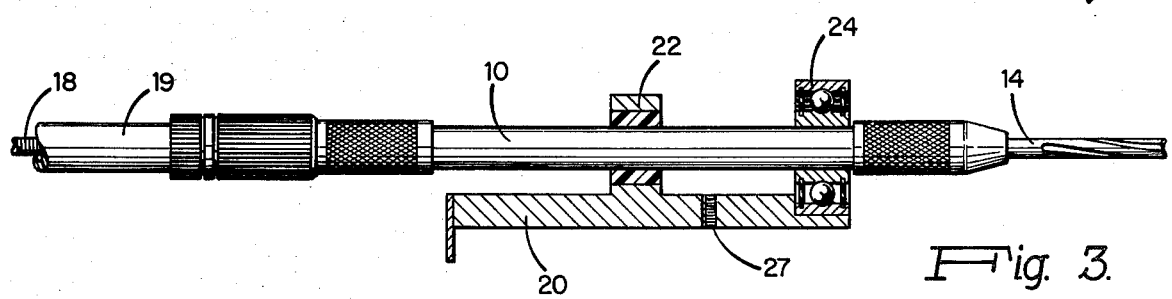
FIG. 3 is a partial side-sectional view of the apparatus illustrating how the drill shaft is rotatably supported by the support frame.

In FIG. 1, the drill body 10 includes chuck 12 on the drilling end and chuck 11 at the opposite end. The drill body 10 is a conventional drilling shaft with a convenient size of about ⅜" in diameter. A drill body of this size can accomodate drill bits 14 of about 1/64"-⅛" in diameter in chuck 12. Of course, a larger drill body can be used to accomodate larger bits; however, there is some loss in maneuverability if the drill body and bit become too large. For most close-quarter purposes, it is sufficient to be able to drill holes of about 1/64"-⅛" in diameter. The drill can be operated either manually with crank 16 attached to chuck 11; or alternatively, chuck 11 with accomodate a flexible shaft 18 as illustrated in FIG. 3 for power operation.

Drill body 10 is rotatably mounted on support frame 20 by means of two aligned bearings 22 and 24. In the preferred embodiment of this invention, the drilling-side bearing 24 is a ball bearing (as shown more clearly in FIG. 3) whereas bearing 22 is preferably a "Teflon" or similar stationary bearing. The reason for this is the drill body 10 must be able to ride with frame 20 and be able to rotate at the same time. This can be achieved only by means of a ball bearing 24 which, by virtue of a snug fit, grips the drill body. Bearing 22 serves solely to support body 10. Although bearing 22 could also be a ball bearing, this would entail unnecessary cost and alignment difficulty. "Teflon" is chosen because of its well-known lubrication quality; however, other similar materials could also be used. Support frame 20 comprises a flat base portion which supports the bearings and moves in a guide channel as described below, and also a thumb rest 26, by which the support frame may be manually advanced in the guide channel. The bearings preferably fit in machined contours (not shown) and are epoxy-bonded. In place of the thumb rest, it is also within the scope of this invention to employ any other means, for example, screw means, of advancing support frame 20 in the channel.

The support frame 20 is mounted on a guide frame 30 by means of a channel 32 such that support frame 20 can move or slide along channel 32 in a linear direction. Guide frame 30 further comprises a stock 34 having a flat outward face for stabilizing the apparatus by resting against the surface to be drilled. The plane of the stock 34 is perpendicular to the plane of channel 32. Stock 34 may also contain a hole 33 to accomodate a screw (not shown) of any convenient size for holding the drilling apparatus in a fixed position. Guide frame 30 also includes a handle 36 for manually positioning the drilling apparatus and then either manually or mechanically holding the apparatus in place during the drilling operation.

Figure 2:
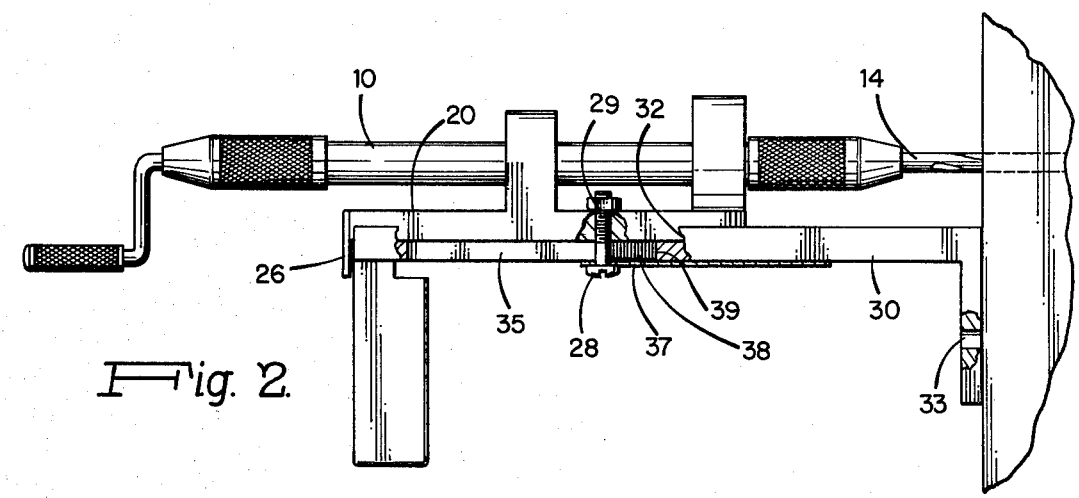
FIG. 2 is a partially cut-away side view of the apparatus illustrating the internal mechanism which joins the support frame and the guide frame.

FIG. 2 shows a side view of the drilling apparatus in which a part of channel 32 is cut-away to better illustrate how the support frame 20 and the guide frame 30 are slidably fastened. Support frame 20 includes internal threads (designated 27 in FIG. 3) passing entirely through the flat base portion 25 to accomodate a screw 28 and lock nut 29. Similarly, guide frame 30 includes an elongated slot 35 to accomodate screw 28. Because of slot 35, screw 28 and, therefore, support frame 20, is capable of limited linear movement with respect to guide frame 30 along channel 32. Screw 28 is tightened sufficiently to hold the support frame and guide frame securely, but not so tightly as to inhibit the free sliding of support frame 20 along channel 32.

In the preferred embodiment of this invention, a portion of the underside of channel 32 surrounding slot 35 is hollowed out to form a spring chamber to accomodate a compression spring 38. A removable sliding cover 37 is provided to conceal spring 38. Spring 38 is so positioned that as support frame 20 is manually advanced along channel 32, the spring is compressed against the forward wall 39 of the spring chamber by screw 28 advancing in slot 35. Spring cover 37 is fastened to screw 28 and, thus, advances as the spring is compressed. When pressure is removed from thumb rest 26, spring 38 will uncompress thereby automatically returning support frame 20 to its original position in channel 32.

FIG. 3 is a sectional side view of the drilling apparatus taken through support frame 20. FIG. 3 shows bearing 24 as a ball bearing and bearing 22 as a fixed bearing. Internal threads 27 extending through support frame 20 are also clearly illustrated. Also shown in FIG. 3 is the embodiment wherein a power-operated flexible shaft 18 is substituted for manual crank 16. A covering or shield 19 is provided around flexible shaft 18 for safety purposes.

To use the drilling apparatus of this invention, a bit of appropriate size is selected and inserted into the drilling end chuck. Holding the entire apparatus in one hand by the handle, the flat, outer face of the stock is placed squarely against the surface to be drilled, aligning the end of the drill bit with the pre-marked spot for drilling. As the drill is turned, either manually using the free hand or by power, pressure is applied to the support frame by pressing gently on the thumb rest for example with the thumb of the first hand. This advances the support frame along the channel of the guide frame until the drill bit engages the surface to be drilled. Continuing pressure applied to the support frame continues to slowly advance the drilling shaft until the bit has drilled to the desired depth. The desired drilling depth will vary with different applications, but this apparatus may be readily designed to accomodate any desired depth depending on the size of the channel, the screw slot and the compression spring. When pressure is removed from the thumb rest, the spring will uncompress thereby automatically returning the support frame, including the drill shaft and bit, to its original position.

By means of this invention, an apparatus is provided for drilling accurate holes in confined areas, specifically within close distance of two or more perpendicular surfaces.

Having described the invention, what is claimed is:

1. A drilling apparatus specially suitable for close-quarter drilling applications within about ⅛" of an adjoining surface comprising: drill support means comprising a substantially flat support base having a forward end and a rearward end and at least one ball bearing located along said support base, said drill support means rotatably supporting drilling means in said ball bearing while preventing linear movement of said drilling means with respect to said support base; guide means comprising channel means for supporting said drill support means in linear movable relationship and handle means for manually supporting said drilling apparatus; manual advancement means for said drill support means comprising a thumb rest located at or near said rearward end of said support base in proximate relationship to said handle means and also in substantially direct alignment with said channel means; and, stabilization means for positioning said drilling apparatus against a flat surface such that said drilling means is set substantially perpendicular to said flat surface.

2. The drilling apparatus of claim 1 wherein said drill support means and said guide means are fastened together by screw means, and said guide means includes elongated slot means for accommodating said screw means and permitting linear movement of said drill support means along said channel means.

3. The drilling apparatus of claim 2 wherein said slot means includes spring means for automatically returning said drill support means to its original location in said channel means following a manual displacement.

4. The drilling apparatus of claim 3, including movable cover means to cover said slot means, said cover means being fastened to and moving with said screw means.

5. The drilling apparatus of claim 1 wherein said drill support means includes two bearings in aligned relationship for rotatably supporting said drilling means.

6. The drilling apparatus of claim 5 wherein said drilling means is rotatably mounted on said drill support means by one ball bearing and one fixed bearing.

7. The drilling apparatus of claim 1 wherein said drilling means comprises a cylindrical drilling shaft of about ⅜" diameter, a forward chuck designed to accommodate drill bits of about 1/64"-¼" in diameter, and a rear chuck designed to accommodate either a crank for manual operation or a flexible shaft for power operation.

8. The drilling apparatus of claim 1 additionally including spring means for automatically returning said drill support means to its original location in said channel means following a manual displacement.

* * * * *

UNITED STATES PATENT OFFICE
CERTIFICATE OF CORRECTION

PATENT NO. : 4,134,705
DATED : January 16, 1979
INVENTOR(S) : Samuel C. Smith

It is certified that error appears in the above-identified patent and that said Letters Patent are hereby corrected as shown below:

Abstract Page, Col. 1, line 2 - "Harlman" should be -- Hartman --.

Col. 2, line 16 - "with" should be -- will --.

Signed and Sealed this

Fourteenth Day of August 1979

[SEAL]

*Attest:*

*Attesting Officer*

LUTRELLE F. PARKER
*Acting Commissioner of Patents and Trademarks*